(12) United States Patent
Zhou et al.

(10) Patent No.: US 10,145,029 B2
(45) Date of Patent: Dec. 4, 2018

(54) GRAPHENE FIBER AND PREPARTION METHOD THEREOF

(71) Applicants: Huawei Technologies Co., Ltd., Shenzhen (CN); Zhejiang University, Hangzhou (CN)

(72) Inventors: Xiaosong Zhou, Shenzhen (CN); Yan Xu, Shenzhen (CN); Chao Gao, Hangzhou (CN); Zhen Xu, Hangzhou (CN)

(73) Assignees: Huawei Technologies Co., Ltd., Shenzhen (CN); Zhejiang University, Hangzhou (CN)

( * ) Notice: Subject to any disclaimer, the term of this patent is extended or adjusted under 35 U.S.C. 154(b) by 849 days.

(21) Appl. No.: 14/559,630

(22) Filed: Dec. 3, 2014

(65) Prior Publication Data

US 2015/0093572 A1   Apr. 2, 2015

Related U.S. Application Data

(63) Continuation of application No. PCT/CN2013/085113, filed on Oct. 12, 2013.

(30) Foreign Application Priority Data

Apr. 10, 2013   (CN) .......................... 2013 1 0123516

(51) Int. Cl.
*D01F 9/12*   (2006.01)
*D01D 5/06*   (2006.01)
(Continued)

(52) U.S. Cl.
CPC .............. *D01F 9/12* (2013.01); *C01B 32/182* (2017.08); *C01B 32/194* (2017.08); *D01D 5/06* (2013.01);
(Continued)

(58) Field of Classification Search
CPC .... D01F 9/12; D01F 1/09; D01D 5/06; D01D 10/06; D10B 2101/12; D10B 2101/20; D10B 2401/16
See application file for complete search history.

(56) References Cited

U.S. PATENT DOCUMENTS 8,043,800 B2   10/2011   Naoi
2011/0018424 A1   1/2011   Takada
(Continued)

FOREIGN PATENT DOCUMENTS

CN   102176338 A   9/2011
CN   102534868 A   7/2012
(Continued)

OTHER PUBLICATIONS

Inktec Publication, Korea, pp. 1-8. 2014.*
(Continued)

*Primary Examiner* — Holly C Rickman
(74) *Attorney, Agent, or Firm* — Leydig, Voit & Mayer, Ltd.

(57) ABSTRACT

A graphene fiber and a preparation method thereof, where the graphene fiber is a composite fiber of metal nanowire doped graphene fiber, and principal components of the composite fiber are graphene and metal nanowires, a mass ratio of metal nanowires is 0.1%-50%, the graphene is in a form of sheet, and both the metal nanowires and graphene sheets are arranged in parallel along an axial direction of the graphene fiber. The metal nanowire doped graphene fiber is a new type of a high performance multi-functional fiber material, which achieves a significant improvement in electrical conductivity of graphene fibers through doping of metal nanowires and meanwhile demonstrates excellent tensile strength and toughness. The metal nanowire doped graphene fiber has great potential application value in a
(Continued)

plurality of fields, for example, it is used as a lightweight flexible wire.

20 Claims, 1 Drawing Sheet

(51) Int. Cl.
  *D01F 1/09* (2006.01)
  *D01F 11/10* (2006.01)
  *C01B 32/182* (2017.01)
  *C01B 32/194* (2017.01)
(52) U.S. Cl.
  CPC ............... *D01F 1/09* (2013.01); *D01F 11/10* (2013.01); *D10B 2101/12* (2013.01); *D10B 2101/20* (2013.01); *D10B 2401/16* (2013.01); *Y10T 428/2918* (2015.01)

(56) References Cited

U.S. PATENT DOCUMENTS

| 2011/0070404 | A1 | 3/2011 | Naoi |
| 2013/0081678 | A1 | 4/2013 | Naito et al. |
| 2014/0004344 | A1 | 1/2014 | Kim et al. |
| 2014/0050920 | A1* | 2/2014 | Ray ..................... D02G 3/16 428/368 |

FOREIGN PATENT DOCUMENTS

| CN | 102817111 A | 12/2012 |
| CN | 102938262 A | 2/2013 |
| CN | 103035311 A | 4/2013 |
| EP | 2535903 A2 | 12/2012 |
| EP | 2687626 A2 | 1/2014 |
| JP | 2006272876 A | 10/2006 |
| JP | 2009127092 A | 6/2009 |
| JP | 2009535530 A | 10/2009 |
| JP | 2011065944 A | 3/2011 |
| JP | 2011082092 A | 4/2011 |
| JP | 2012164808 A | 8/2012 |
| WO | WO 2007130979 A3 | 11/2007 |
| WO | WO 2010010838 A1 | 1/2010 |
| WO | WO 2012124934 A2 | 9/2012 |

OTHER PUBLICATIONS

WO 2014/166219, PCT 409 document, dated Jan. 23, 2014.*
Cong et al., "Wet-spinning assembly of continuous, neat, and macroscopic graphene fibers," Scientific Reports, vol. 2, Article 613 (Aug. 30, 2012).
Xu et al., "Highly Electrically Conductive Ag-Doped Graphene Fibers as Stretchable Conductors," Advanced Materials, vol. 25, pp. 3249-3253 (2013).
Xu et al., "Aqueous Liquid Crystals of Graphene Oxide," ASC Nano, vol. 5, No. 4, pp. 2908-2915, American Chemical Society, Washington D.C. (Mar. 4, 2011).
Xu et al., "Graphene chiral liquid crystals and macroscopic assembled fibres," Nature Communications, vol. 2, No. 571, pp. 1-9, Macmillan Publishers Ltd., London, UK (Dec. 6, 2011).
Xu et al., "Ultrastrong Fibers Assembled from Giant Graphene Oxide Sheets," Advanced Materials, vol. 25, pp. 188-193, Wiley-VCH Verlag GmbH & Co. KGaA, Weinheim, Germany (2013).

* cited by examiner

GRAPHENE FIBER AND PREPARTION METHOD THEREOF

CROSS-REFERENCE TO RELATED APPLICATIONS

This application is a continuation of International Patent Application No. PCT/CN2013/085113, filed on Oct. 12, 2013, which claims priority to Chinese Patent Application No. 201310123516.0, filed on Apr. 10, 2013, both of which are hereby incorporated by reference in their entireties.

TECHNICAL FIELD

The present application relates to a fiber material, and in particular, to a graphene fiber and preparation method thereof.

BACKGROUND

Graphene is a new allotrope of two dimensional carbon, and has attracted wide attention from the very beginning. Graphene has the highest strength of all known materials, and excellent electrical conductivity and thermal conductivity. Therefore, graphene can be used as an ideal assembly unit for preparing a high performance fiber, aerogel, a thin film and a nano composite material, where the graphene fiber is a new type of a high performance multi-functional fiber material that can be continually prepared by using graphene oxide liquid crystal. During the preparation of a graphene fiber, non-conductive graphene oxide is converted into conductive graphene under the action of chemical reduction or thermal reduction. However, experimental tests show that the graphene obtained through reduction of graphene oxide still has a structural conductivity deficiency, which largely restricts an improvement in electrical conductivity of a graphene fiber.

SUMMARY

Embodiments of the present application provide a graphene fiber and a preparation method thereof, where the graphene fiber eliminates a structural conductivity deficiency in graphene that is obtained through reduction of graphene oxide and thereby exhibits excellent electrical conductivity.

A graphene fiber is a composite fiber of metal nanowire doped graphene fiber, in which principal components of the composite fiber are graphene and metal nanowires, the mass ratio of nanowires is 0.1%-50%, the graphene is in a form of sheet, and both the metal nanowires and graphene sheets are arranged in parallel along an axial direction of the graphene fiber.

A graphene fiber preparation method mainly includes three steps. First, add metal nanowires whose mass fraction is 0.1%-50% to graphene oxide liquid crystal whose mass concentration is 0.3%-3%, and then stir at a speed of 100-1000 rpm evenly to form graphene oxide-metal nanowire spinning sol; then, have the obtained graphene oxide-metal nanowire spinning sol pass through a spinning tube that is 5-500 μm in diameter at a 1-100 mL/h extrusion speed and put it in 5-80° C. coagulating fluid for 1-100 s to coagulate into filaments, and then wash and dry the filaments to get a metal nanowire doped graphene oxide fiber; finally, put the obtained metal nanowire doped graphene oxide fiber in a reducing agent for 0.1-100 h and then perform washing or perform thermal reduction to get a metal nanowire doped graphene fiber.

For the foregoing graphene fiber and the preparation method thereof, spinning is performed on graphene oxide metal nanowire spinning sol during the preparation, where during the spinning process, the graphene oxide metal nanowire spinning sol under the action of spinning flow field allows graphene oxide sheets to be arranged along an axial direction of the fiber in a more orderly fashion, and meanwhile helps the metal nanowires dispersed in the spinning sol to be arranged along the axial direction of the fiber, so as to form a microstructure in which the graphene oxide sheets and the metal nanowires are arranged along the axial direction of the fiber in an orderly fashion; the metal nanowires arranged along the axial direction of the fiber are attached to a surface of graphene and connected to a graphene stacking boundary, so as to reduce resistance caused by the deficiencies in the graphene sheets and grain boundary resistance formed among the overlay graphene sheets, thereby achieving a significant improvement in electrical conductivity of a metal wire doped graphene fiber.

BRIEF DESCRIPTION OF DRAWINGS

To describe the technical solutions in the embodiments of the present application or in the prior art more clearly, the following briefly introduces the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

Embodiment 1

Figure 1:
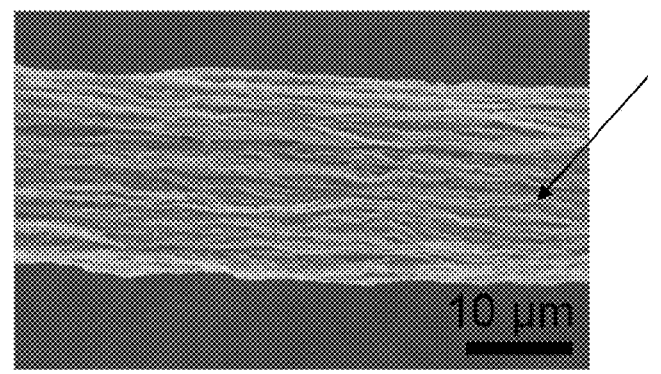
FIG. 1 is a scanning electron microscope photo of a surface of a graphene fiber according to an embodiment of the present application.

As shown in FIG. 1, a graphene fiber provided in Embodiment 1 of the present application is a composite fiber of metal nanowire doped graphene fiber, where principal components of the composite fiber are graphene and metal nanowires, the mass ratio of nanowires is 0.1%-50%, the graphene is in a form of sheet, and both the metal nanowires and graphene sheets are arranged in parallel along an axial direction of the graphene fiber.

Figure 2:
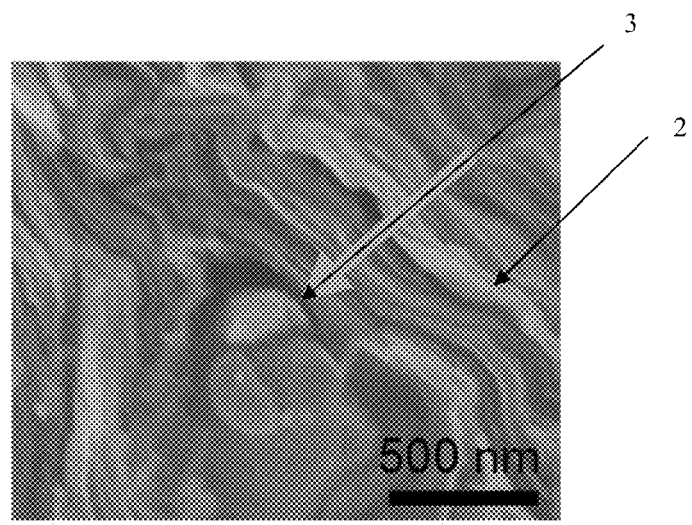
FIG. 2 is a scanning electron microscope photo of a section of a graphene fiber according to an embodiment of the present application.

The scanning electron microscope photo of a surface of a metal nanowire doped graphene fiber is shown in FIG. 1, where the nanowires in the graphene fiber 1 are arranged in a longitudinal direction; the scanning electron microscope photo of a section of the metal nanowire doped graphene fiber is shown in FIG. 2, where the graphene is dispersed in parallel in a form of sheet 2; the spots pointed by the arrow are end faces of the metal nanowires 3; it can be seen that, the nanowires 3 are arranged vertically with respect to the paper and in parallel to the graphene sheets 2.

The graphene fiber is a one-dimensional fiber and is 1 μm-500 μm in diameter; a length of the fiber may reach hundreds of meters, and its typical diameter is 10 μm.

The composite fiber of metal nanowire doped graphene is prepared by applying a wet spinning method to graphene liquid crystals, where graphene oxide liquid crystals and metal nanowires are used as raw materials; the metal nanowire doped graphene fiber is first obtained by using the wet spinning method, then reduction processing is performed by using reducing agents, such as hydrazine hydrate, sodium borohydride, vitamin C, hydrobromic acid, hydriodic acid, acetic acid or their mixture, or thermal reduction processing is performed at a temperature 200° C.-1000° C. to obtain highly electrical-conductive metal-nanowires doped graphene fiber.

The mass ratio of the metal nanowires is 0.5%, 20%, or 50%.

The metal nanowires during the preparation process include gold nanowires, silver nanowires, copper nanowires, Pt nanowires, iridium nanowires, rhodium nanowires, Fe nanowires, nickel nanowires, cobalt nanowires, zinc oxide nanowires, titanium nanowires, and alloy nanowires or hybrid nanowires of these nanowires.

The metal nanowires are 3-300 nm in diameter and 100 nm-50 μm in length.

Figure 3:
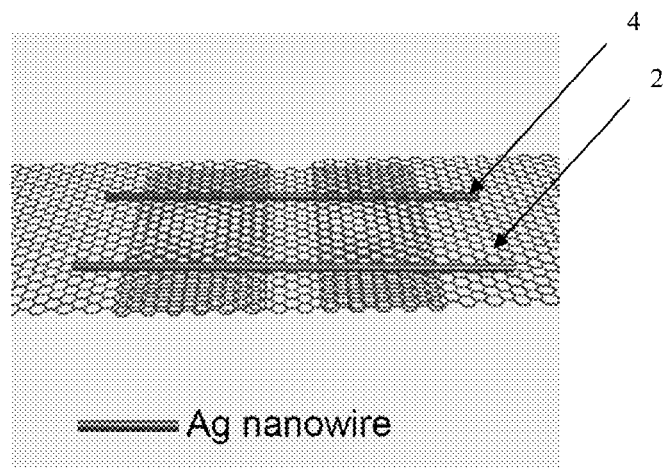
FIG. 3 is a schematic diagram of a microstructure of a silver nanowire doped graphene fiber according to an embodiment of the present application.

As shown in FIG. 3, when the metal nanowires are silver nanowires 4, the silver nanowires 4 are in parallel to each other and in parallel to the graphene sheets 2, and arranged along the axial direction of the fiber 1; the silver nanowire doped graphene fiber demonstrates higher electrical conductivity, strength and toughness, and the electrical conductivity of the prepared silver nanowire doped graphene fiber may be improved to a certain degree by controlling the spinning process, doping amount of the metal nanowires, the reduction process, and the like; the highest electrical conductivity may reach 93000 S/m, the highest ampacity may reach 7100 A/cm$^2$, the tensile strength may be kept above 300 MPa, and the extension at break may be kept around 5%.

The foregoing metal nanowire doped graphene fiber is a new type of a high performance multi-functional fiber material, which achieves a significant improvement in electrical conductivity of graphene fibers through doping of metal nanowires and meanwhile demonstrates excellent tensile strength and toughness. The metal nanowire doped graphene fiber proves advantageous for future use in a plurality of fields, for example, it is used as a lightweight flexible wire.

The foregoing graphene fiber has significant conductive performance. The reason is that, spinning is performed on graphene oxide metal nanowire spinning sol during the preparation of the graphene fiber, where during the spinning process, the graphene oxide metal nanowire spinning sol under the action of spinning flow field allows graphene oxide sheets to be arranged along an axial direction of the fiber, and help the metal nanowires dispersed in the spinning sol to be arranged along the axial direction of the fiber, so as to form a microstructure in which the graphene oxide sheets and the metal nanowires are arranged along the axial direction of the fiber in an orderly fashion; the metal nanowires arranged along the axial direction of the fiber are attached to the surface of graphene and connected to a graphene stacking boundary, so as to reduce resistance caused by the defects in the graphene sheets and the grain boundary resistance formed among the overlay graphene sheets, thereby achieving a significant improvement in electrical conductivity of a metal wire doped graphene fiber.

Embodiment 2

A graphene fiber preparation method provided in Embodiment 2 mainly adopts an oxidation method to prepare graphene oxide, and disperse graphene oxide to solvent to prepare graphene oxide liquid crystals, add metal nanowires to the graphene oxide liquid crystals to prepare graphene oxide-metal nanowire spinning sol, perform wet spinning, and perform reduction on the obtained metal nanowire doped graphene oxide fiber to obtain a metal nanowire doped graphene fiber, which specifically includes the following steps:

Step 201: Add metal nanowires whose mass fraction is 0.1%-50% to graphene oxide liquid crystals whose mass concentration is 0.3%-3%, and then stir at a speed of 100-1000 rpm evenly to form graphene oxide-metal nanowire spinning sol.

Step 202: Have the graphene oxide-metal nanowire spinning sol obtained in step 201 pass through a spinning tube that is 5-500 μm in diameter at a 1-100 mL/h extrusion speed and stay in 5-80° C. coagulating fluid for 1-100 s to coagulate into filaments, and then wash and dry the filaments to get a metal nanowire doped graphene oxide fiber.

Step 203: Put the metal nanowire doped graphene oxide fiber obtained in step 202 in a reducing agent for 0.1-100 h and perform washing or perform thermal reduction to get a metal nanowire doped graphene fiber.

The graphene oxide liquid crystals used in step 201 are obtained by adding a certain amount of graphene oxide in the solvent and stirring, where the solvent includes water, N,N-dimethylformamide, N,N-dimethylacetamide, N-Methyl-2-pyrrolidone, methanol, ethanol, isopropanol, butanol and ethylene glycol, where the graphene oxide in use is prepared by means of oxidation of natural graphite or pyrolytic graphite.

The metal nanowires used in step 201 include gold nanowires, silver nanowires, copper nanowires, Pt nanowires, iridium nanowires, rhodium nanowires, Fe nanowires, nickel nanowires, cobalt nanowires, zinc oxide nanowires, titanium nanowires, and alloy nanowires or hybrid nanowires of these nanowires, where the metal nanowires are 3-300 nm in diameter and 100 nm-50 μm in length.

The coagulating fluid used in step 202 includes organic solvent, such as sodium hydroxide, potassium hydroxide, calcium chloride, sodium nitrate, potassium nitrate, sodium chloride, potassium chloride, ferric chloride solution, and ethyl acetate.

The reducing agent used in step 203 includes hydrazine hydrate, sodium borohydride, vitamin C, hydrobromic acid, hydriodic acid, acetic acid, and their mixture.

The temperature range of heat treatment used in step 203 is between 200° C. and 1000° C., and the time ranges from 1 to 10 hours.

The highly electrical-conductive metal nanowire doped graphene oxide fiber obtained by using the foregoing method is formed by arranging and stacking the graphene after reduction and metal nanowires along an axial direction; the diameter of the fiber is 1-500 μm, the tensile strength is 10-800 MPa, the extension at break is 0.2-10%, and the electrical conductivity is over 10000 S/m.

The foregoing graphene fiber preparation method adopts a solvent spinning approach to prepare a highly electrical-conductive metal nanowire doped graphene fiber, where the method is easy to operate and environmental friendly, and the obtained highly electrical-conductive metal nanowires have great strength, toughness and excellent electrical conductivity.

The following table shows that, in the foregoing graphene fiber preparation method, the diameter, length, electrical conductivity, ampacity, tensile strength, and extension at break of the obtained metal nanowire doped graphene fiber may vary according to concentration of graphene oxide crystals, graphene oxide crystal solvent, metal nanowire type, mass percentage of metal nanowires and reduction process. For details, reference may be made to the following table, in which a specific material adopted or ingredient proportion listed in each row corresponds to Embodiments 3 to 7 respectively.

Step 303: Put the silver nanowire doped graphene oxide fiber in a 30% hydroiodic acid of 90° C. for 1-hour reduction, and then perform washing to get a highly electrical-conductive silver nanowire doped graphene fiber.

The highly electrical-conductive silver nanowire doped graphene oxide fiber obtained by using the preparation method provided in this embodiment is formed by arranging and stacking the graphene after reduction and silver nanowires along an axial direction of the fiber; the diameter of the fiber is 1 μm, the tensile strength is 800 MPa, the extension at break is 5%, and the electrical conductivity is over 50000 S/m.

Embodiment 4

A graphene fiber preparation method provided in Embodiment 4 of the present application is similar to the method provided in Embodiment 2 in terms of specific operation procedure. The only difference lies in that concentration of graphene liquid crystals, graphene oxide liquid crystal solvent, metal nanowire type, mass percentage of metal nanowires, reduction process, and the like that are used for

| Concentration of graphene oxide crystals | Solvent | Metal nanowire type | Mass percentage of metal nanowires | Reduction process | Diameter of the obtained metal nanowire doped graphene fiber | Metal nanowire doped graphene fiber | Electrical conductivity S/m | Ampacity A/cm2 | Tensile strength | Extension at break |
|---|---|---|---|---|---|---|---|---|---|---|
| 0.30% | Water | Ag | 0.50% | 30% hydroiodic acid of 90° C. for reduction | 1 μm | Over 100 m | 30000 | 2000 | 800 MPa | 5% |
| 0.30% | N,N-dimethylformamide | Cu | 50% | 0.1% hydrazine hydrate solution of 90° C. for 1-hour reduction | 5 μm | Over 100 m | 10000 | 6000 | 400 MPa | 5% |
| 3% | N,N-dimethylformamide | Au | 0.50% | under 1000° C. for 1-hour reduction | 50 μm | Over 100 m | 40000 | 7000 | 100 MPa | 5% |
| 3% | Water | Ag | 50% | under 200° C. for 1-hour reduction | 5 μm | Over 100 m | 30000 | 6000 | 360 MPa | 5% |
| 0.5% | N,N-dimethylformamide | Ag | 20% | 30% hydroiodic acid of 90° C. for 1-hour reduction; under 200° C. for 10-hour reduction | 10 μm | Over 100 m | 93000 | 7000 | 400 MPa | 5% |

Embodiment 3

A graphene fiber preparation method provided in Embodiment 3 of the present application is similar to the method provided in Embodiment 2 in terms of specific operation procedure. The only difference lies in that concentration of graphene liquid crystals, graphene oxide liquid crystal solvent, metal nanowire type, mass percentage of metal nanowires, reduction process, and the like that are used for preparing a graphene fiber are different. The method specifically includes the following steps:

Step 301: Add silver nanowires whose mass fraction is 0.5% to graphene oxide liquid crystal aqueous dispersion whose mass concentration is 0.3%, and then stir at a speed of 100 rpm evenly to form graphene oxide-silver nanowire spinning sol.

Step 302: Have the graphene oxide-silver nanowire spinning sol obtained in step 301 pass through a spinning tube that is 30 μm in diameter at a 1 mL/h extrusion speed and stay in a 5 wt % aqueous solution of calcium chloride of 5° C. for 100 s to coagulate into filaments, and then wash and dry the filaments to get a silver nanowire doped graphene oxide fiber.

preparing a graphene fiber are different. The method specifically includes the following steps:

Step 401: Add copper nanowires whose mass fraction is 50% to graphene oxide liquid crystal N,N-dimethylformamide phase dispersion whose mass concentration is 0.3%, and then stir at a speed of 100 rpm evenly to form graphene oxide-silver nanowire spinning N,N-dimethylformamide sol.

Step 402: Have the graphene oxide-silver nanowire spinning N,N-dimethylformamide sol obtained in step 401 pass through a spinning tube that is 50 μm in diameter at a 1 mL/h extrusion speed and stay in 25° C. ethyl acetate solvent for 100 s to coagulate into filaments, and then wash and dry the filaments to get a copper nanowire doped graphene oxide fiber.

Step 403: Put the silver nanowire doped graphene oxide fiber obtained in step 402 in a 0.1% hydrazine hydrate solution of 90° C. for 1-hour reduction, and then perform washing to get a highly electrical-conductive copper nanowire doped graphene fiber.

The highly electrical-conductive copper nanowire doped graphene oxide fiber obtained by using the preparation method provided in this embodiment is formed by arranging and stacking the graphene after reduction and copper nanowires along an axial direction of the fiber; the diameter of the fiber is 5 μm, the tensile strength is 400 MPa, the extension at break is 5%, and the electrical conductivity is over 10000 S/m.

Embodiment 5

A graphene fiber preparation method provided in Embodiment 5 of the present application is similar to the method provided in Embodiment 2 in terms of specific operation procedure. The only difference lies in that concentration of graphene liquid crystals, graphene oxide liquid crystal solvent, metal nanowire type, mass percentage of metal nanowires, reduction process, and the like that are used for preparing a graphene fiber are different. The method specifically includes the following steps:

Step 501: Add gold nanowires whose mass fraction is 0.5% to graphene oxide liquid crystal N,N-dimethylformamide phase dispersion whose mass concentration is 3%, and then stir at a speed of 1000 rpm evenly to form graphene oxide-gold nanowire spinning N,N-dimethylformamide sol.

Step 502: Have the graphene oxide-gold nanowire spinning N,N-dimethylformamide sol obtained in step 501 pass through a spinning tube that is 500 μm in diameter at a 100 mL/h extrusion speed and stay in 50° C. ethyl acetate solvent for 10 s to coagulate into filaments, and then wash and dry the filaments to get a gold nanowire doped graphene oxide fiber.

Step 503: Put the gold nanowire doped graphene oxide fiber obtained in step 502 under 1000° C. for 1-hour reduction to obtain a highly electrical-conductive gold nanowire doped graphene oxide fiber.

The highly electrical-conductive gold nanowire doped graphene oxide fiber obtained by using the preparation method provided in this embodiment is formed by arranging and stacking the graphene after reduction and gold nanowires along an axial direction of the fiber; the diameter of the fiber is 50 μm, the tensile strength is 100 MPa, the extension at break is 5%, and the electrical conductivity is over 40000 S/m.

Embodiment 6

A graphene fiber preparation method provided in Embodiment 6 of the present application is similar to the method provided in Embodiment 2 in terms of specific operation procedure. The only difference lies in that concentration of graphene liquid crystals, graphene oxide liquid crystal solvent, metal nanowire type, mass percentage of metal nanowires, reduction process, and the like that are used for preparing a graphene fiber are different. The method specifically includes the following steps:

Step 601: Add silver nanowires whose mass fraction is 50% to graphene oxide liquid crystal aqueous dispersion whose mass concentration is 3%, and then stir at a speed of 1000 rpm evenly to form graphene oxide-silver nanowire spinning sol.

Step 602: Have the graphene oxide-silver nanowire spinning sol obtained in step 601 pass through a spinning tube that is 50 μm in diameter at a 1 mL/h extrusion speed and stay in a 5 wt % sodium hydroxide ethanol solution of 5° C. for 10 s to coagulate into filaments, and then wash and dry the filaments to get a silver nanowire doped graphene oxide fiber.

Step 603: Put the silver nanowire doped graphene oxide fiber obtained in step 602 under 200° C. for 10-hour reduction to obtain a highly electrical-conductive silver nanowire doped graphene oxide fiber.

The highly electrical-conductive silver nanowire doped graphene oxide fiber obtained by using the preparation method provided in this embodiment is formed by arranging and stacking the graphene after reduction and silver nanowires along an axial direction of the fiber; the diameter of the fiber is 5 μm, the tensile strength is 300 MPa, the extension at break is 5%, and the electrical conductivity is over 30000 S/m.

Embodiment 7

A graphene fiber preparation method provided in Embodiment 7 of the present application is similar to the method provided in Embodiment 2 in terms of specific operation procedure. The only difference lies in that concentration of graphene liquid crystals, graphene oxide liquid crystal solvent, metal nanowire type, mass percentage of metal nanowires, reduction process, and the like that are used for preparing a graphene fiber are different. The method specifically includes the following steps:

Step 701: Add silver nanowires whose mass fraction is 20% to graphene oxide liquid crystal aqueous dispersion whose mass concentration is 0.5%, and then stir at a speed of 1000 rpm evenly to form graphene oxide-silver nanowire spinning sol.

Step 702: Have the graphene oxide-silver nanowire spinning sol obtained in step 701 pass through a spinning tube that is 100 μm in diameter at a 1 mL/h extrusion speed and stay in 25° C. ethyl acetate solvent for 10 s to coagulate into filaments, and then wash and dry the filaments to get a silver nanowire doped graphene oxide fiber.

Step 703: Put the silver nanowire doped graphene oxide fiber obtained in step 702 in 30% hydroiodic acid of 90° C. for 1-hour reduction, and then put it under 200° C. for 10-hour reduction to obtain a highly electrical-conductive silver nanowire doped graphene oxide fiber.

The highly electrical-conductive silver nanowire doped graphene oxide fiber obtained by using the preparation method provided in this embodiment is formed by arranging and stacking the graphene after reduction and silver nanowires along an axial direction of the fiber; the diameter of the fiber is 10 μm, the tensile strength is 400 MPa, the extension at break is 5%, and the electrical conductivity is over 93000 S/m.

Finally, it should be noted that the forgoing embodiments are provided merely to describe the technical solutions of the embodiments of the present invention, but are not intended to limit the technical solutions of the embodiments of the present invention. Although the embodiments of the present invention are described in detail with reference to exemplary embodiments, a person of ordinary skill in the art should understand that, modifications or equivalent replacements may still be made to the embodiments of the present invention without departing from the scope of the technical solutions of the embodiments of the present invention.

What is claimed is:

1. A graphene fiber, wherein the graphene fiber is a composite fiber of metal nanowire doped graphene fiber,
wherein principal components of the composite fiber are graphene and metal nanowires, a mass ratio of metal nanowires is about 0.1%-50%, the graphene is in a form of plural graphene sheets arranged in parallel to each other, and both all of the metal nanowires and all of the graphene sheets are arranged in parallel along an axial direction of the graphene fiber.

2. The graphene fiber according to claim 1, wherein the mass ratio of metal nanowires is about 0.5%-50%.

3. The graphene fiber according to claim 2, wherein the mass ratio of metal nanowires is about 0.5%, 20%, or 50%.

4. The graphene fiber according to claim 1, wherein the metal nanowires comprise gold nanowires, silver nanowires, copper nanowires, Pt nanowires, iridium nanowires, rhodium nanowires, Fe nanowires, nickel nanowires, cobalt nanowires, zinc oxide nanowires, titanium nanowires, and alloy nanowires or hybrid nanowires of these nanowires.

5. The graphene fiber according to claim 1, wherein the metal nanowires are silver nanowires.

6. The graphene fiber according to claim 1, wherein the metal nanowire is about 3-300 nm in diameter and 100 nm-50 μm in length.

7. The graphene fiber according to claim 1, wherein the graphene fiber is a one-dimensional fiber and about 1 μm-500 μm in diameter.

8. The graphene fiber according to claim 1, wherein the graphene fiber is prepared by using graphene oxide and metal nanowire liquid crystals first through a wet spinning process, and then through chemical reduction or thermal reduction.

9. A graphene fiber, wherein the graphene fiber is a composite fiber of metal nanowire doped graphene fiber,
the composite fiber comprises a graphene and metal nanowires, a mass ratio of metal nanowires is a range from 0.1% to 50%, the graphene is in a form of plural graphene sheets arranged in parallel to each other, and both all of the metal nanowires and all of the graphene sheets are arranged in parallel along an axial direction of the graphene fiber.

10. The graphene fiber according to claim 1, wherein the mass ratio of metal nanowires is a range from 0.5% to 50%, the mass ratio of metal nanowires is 0.5%, 20%, or 50%, the metal nanowires comprise gold nanowires, silver nanowires, copper nanowires, Pt nanowires, iridium nanowires, rhodium nanowires, Fe nanowires, nickel nanowires, cobalt nanowires, zinc oxide nanowires, titanium nanowires, and alloy nanowires or hybrid nanowires of these nanowires.

11. A graphene fiber preparation method comprising:
adding metal nanowires whose mass fraction is about 0.1%-50% to graphene oxide liquid crystals whose mass concentration is about 0.3%-3%, and then stirring at a speed of about 100-1000 rpm evenly to obtain graphene oxide-metal nanowire spinning sol;
passing the obtained graphene oxide-metal nanowire spinning sol through a spinning tube that is 5-500 μm in diameter at about a 1-100 mL/h extrusion speed and staying in about 5-80° C. coagulating fluid for about 1-100s to coagulate into filaments;
washing and drying the filaments to get an initial metal nanowire doped graphene oxide fiber;
placing the initial metal nanowire doped graphene oxide fiber in a reducing agent for about 0.1-100h reduction; and
washing or thermally reducing the initial metal nanowire doped graphene oxide fiber to get a final metal nanowire doped graphene fiber that is a composite fiber of metal nanowire doped graphene fiber whose principal components are graphene and metal nanowires,
wherein a mass ratio of the metal nanowires is about 0.1%-50%, the graphene is in a form of plural graphene sheets arranged in parallel to each other, and both all of the metal nanowires and all of the graphene sheets are arranged in parallel along an axial direction of the graphene fiber.

12. The graphene fiber preparation method according to claim 11, wherein the graphene oxide liquid crystals are obtained by adding a certain amount of graphene oxide in solvent and stirring, wherein the solvent comprises water, N,N-dimethylformamide, N,N-dimethylacetamide, N-Methyl-2-pyrrolidone, methanol, ethanol, isopropanol, butanol, and ethylene glycol.

13. The graphene fiber preparation method according to claim 12, wherein the mass concentration of the graphene oxide liquid crystals is about 0.3%, 0.5%, or 3%.

14. The graphene fiber preparation method according to claim 11, wherein a mass ratio of the metal nanowires in the graphene fiber is about 0.5%, 20%, or 50%.

15. The graphene fiber preparation method according to claim 11, wherein the metal nanowires comprise gold nanowires, silver nanowires, copper nanowires, Pt nanowires, iridium nanowires, rhodium nanowires, Fe nanowires, nickel nanowires, cobalt nanowires, zinc oxide nanowires, titanium nanowires, and alloy nanowires or hybrid nanowires of these nanowires.

16. The graphene fiber preparation method according to claim 11, wherein the metal nanowires are silver nanowires.

17. The graphene fiber preparation method according to claim 11, wherein the metal nanowires are about 3-300 nm in diameter and about 100 nm-50 μm in length.

18. The graphene fiber preparation method according to claim 11, wherein the coagulating fluid comprises sodium hydroxide, potassium hydroxide, calcium chloride, sodium nitrate, potassium nitrate, sodium chloride, potassium chloride, ferric chloride solution, and ethyl acetate.

19. The graphene fiber preparation method according to claim 11, wherein the reducing agent comprises hydrazine hydrate, sodium borohydride, vitamin C, hydrobromic acid, hydriodic acid, acetic acid, and their mixture.

20. The graphene fiber preparation method according to claim 11, wherein a temperature range of heat treatment for the thermal reduction is about 200-1000° C., and a time range is about 1-100 h.

* * * * *